(12) United States Patent
Tanaka et al.

(10) Patent No.: US 10,394,110 B2
(45) Date of Patent: Aug. 27, 2019

(54) PHOSPHOR WHEEL MODULE, LIGHT SOURCE DEVICE, AND PROJECTION DISPLAY APPARATUS

(71) Applicant: Panasonic Intellectual Property Management Co., Ltd., Osaka (JP)

(72) Inventors: Masafumi Tanaka, Tokyo (JP); Shigekazu Yamagishi, Osaka (JP); Takashi Ikeda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/718,348

(22) Filed: Sep. 28, 2017

(65) Prior Publication Data

US 2018/0095350 A1  Apr. 5, 2018

(30) Foreign Application Priority Data

Oct. 3, 2016 (JP) .................................. 2016-195908
Aug. 30, 2017 (JP) .................................. 2017-164951

(51) Int. Cl.

| G03B 21/16 | (2006.01) |
|---|---|
| G03B 21/20 | (2006.01) |
| F21V 29/83 | (2015.01) |
| F21V 29/77 | (2015.01) |
| F21V 14/08 | (2006.01) |
| F21V 9/30 | (2018.01) |

(52) U.S. Cl.
CPC ................ *G03B 21/16* (2013.01); *F21V 9/30* (2018.02); *F21V 14/08* (2013.01); *F21V 29/77* (2015.01); *F21V 29/83* (2015.01); *G03B 21/204* (2013.01); *G03B 21/2013* (2013.01)

(58) Field of Classification Search
CPC ......... F21V 9/30–38; F21V 14/08–085; G03B 21/16
See application file for complete search history.

(56) References Cited

U.S. PATENT DOCUMENTS

| 7,018,051 B2 * | 3/2006 | Bok ....................... G03B 21/16 348/743 |
| 9,010,971 B2 | 4/2015 | Wang et al. |
| 2013/0169938 A1 * | 7/2013 | Huang ................... G03B 21/16 353/31 |
| 2014/0354960 A1 | 12/2014 | Miyazaki |

(Continued)

FOREIGN PATENT DOCUMENTS

| JP | 2011-113071 | 6/2011 |
| JP | 2012-18762 | 1/2012 |

(Continued)

*Primary Examiner* — Sean P Gramling
(74) *Attorney, Agent, or Firm* — Wenderoth, Lind & Ponack, L.L.P.

(57) ABSTRACT

A phosphor wheel module includes a substrate and a phosphor region disposed on a surface of the substrate. The phosphor region includes a phosphor that is disposed on at least a part of a circumference of a circle with a first radius from a rotation center of the substrate. The substrate includes a ventilation region and a heat conduction region. The ventilation region includes a plurality of openings that is located closer to the rotation center of the substrate than the phosphor region. The heat conduction region is located farther away from the rotation center of the substrate than the phosphor region.

19 Claims, 7 Drawing Sheets

(56) References Cited

U.S. PATENT DOCUMENTS

| | | | | |
|---|---|---|---|---|
| 2015/0124429 A1* | 5/2015 | Hoehmann | ............... | F21V 9/40 |
| | | | | 362/84 |
| 2015/0229892 A1* | 8/2015 | Dai | ...................... | H04N 9/3158 |
| | | | | 353/31 |
| 2016/0291449 A1 | 10/2016 | Masuda | | |

FOREIGN PATENT DOCUMENTS

| | | |
|---|---|---|
| JP | 2013-41170 | 2/2013 |
| JP | 2015-7751 | 1/2015 |
| JP | 2015-206940 | 11/2015 |
| WO | 2015/087406 | 6/2015 |

* cited by examiner

PHOSPHOR WHEEL MODULE, LIGHT SOURCE DEVICE, AND PROJECTION DISPLAY APPARATUS

BACKGROUND

1. Technical Field

The present disclosure relates to phosphor wheel modules for use in light source devices of projection display apparatuses, and to light source devices and projection display apparatuses each of which is equipped with such a phosphor wheel module, for example.

2. Description of the Related Art

Some types of conventional projection display apparatuses use fluorescent light that is generated by irradiating a phosphor with an excitation light. In the projection display apparatus of these types, the temperature of such a phosphor sometimes increases with increasing luminance.

U.S. Pat. No. 9,010,971 discloses a configuration of a phosphor wheel module having a heat quenching function. The phosphor wheel module includes a phosphor wheel, a large number of air vents penetrating through the phosphor wheel, and an impeller. The phosphor wheel has a first surface and a second surface located on the reverse side of the first surface, with at least one kind of phosphor being coated on the outer periphery of the first surface. The impeller is disposed on the second surface side of the phosphor wheel, and has an inlet and a first outlet. When the phosphor wheel is rotated at a high rotation speed, part of air inhaled from the inlet of the impeller is exhausted from the outlet disposed in the impeller. The rest of the air is conveyed, through the large number of the air vents, to reach the first surface side of the phosphor wheel, thereby removing heat from the surface of the phosphor wheel.

In accordance with U.S. Pat. No. 9,010,971, it is possible to improve the cooling efficiency of the phosphor wheel without any increase in size of the phosphor wheel, and to reduce a local temperature rise of a phosphor-coated part. This allows downsizing of a laser projection system that uses the phosphor wheel. Alternatively, it is possible to improve resistance to a high-power excitation light without any increase in size of the phosphor wheel, thereby achieving improved luminance of the laser projection system.

SUMMARY

A phosphor wheel module according to an embodiment of the present disclosure includes a substrate and a phosphor region disposed on a surface of the substrate. The phosphor region includes a phosphor that is disposed on at least a part of a circumference of a circle with a first radius from a rotation center of the substrate. The substrate includes a ventilation region and a heat conduction region. The ventilation region includes a plurality of openings that is located closer to the rotation center of the substrate than the phosphor region. The heat conduction region is located farther away from the rotation center of the substrate than the phosphor region.

In accordance with the present disclosure, it is possible to reduce a decrease in heat conductivity of the substrate and to reduce a local temperature rise of the phosphor, thereby allowing the phosphor wheel module to be provided which features improved heat quenching characteristics over conventional ones.

DETAILED DESCRIPTION

Hereinafter, detailed descriptions of embodiments will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art.

Note that the applicants provide the accompanying drawings and the following descriptions so as to facilitate fully understanding of the present disclosure by those skilled in the art, and have no intention of imposing any limitation on the subject matter set forth in the appended claims.

First Exemplary Embodiment

Descriptions will be made regarding a phosphor wheel module, light source device, and projection display apparatus, according to a first embodiment, with reference to FIGS. 1 to 4.

1-1. Phosphor Wheel Module

Figure 1:
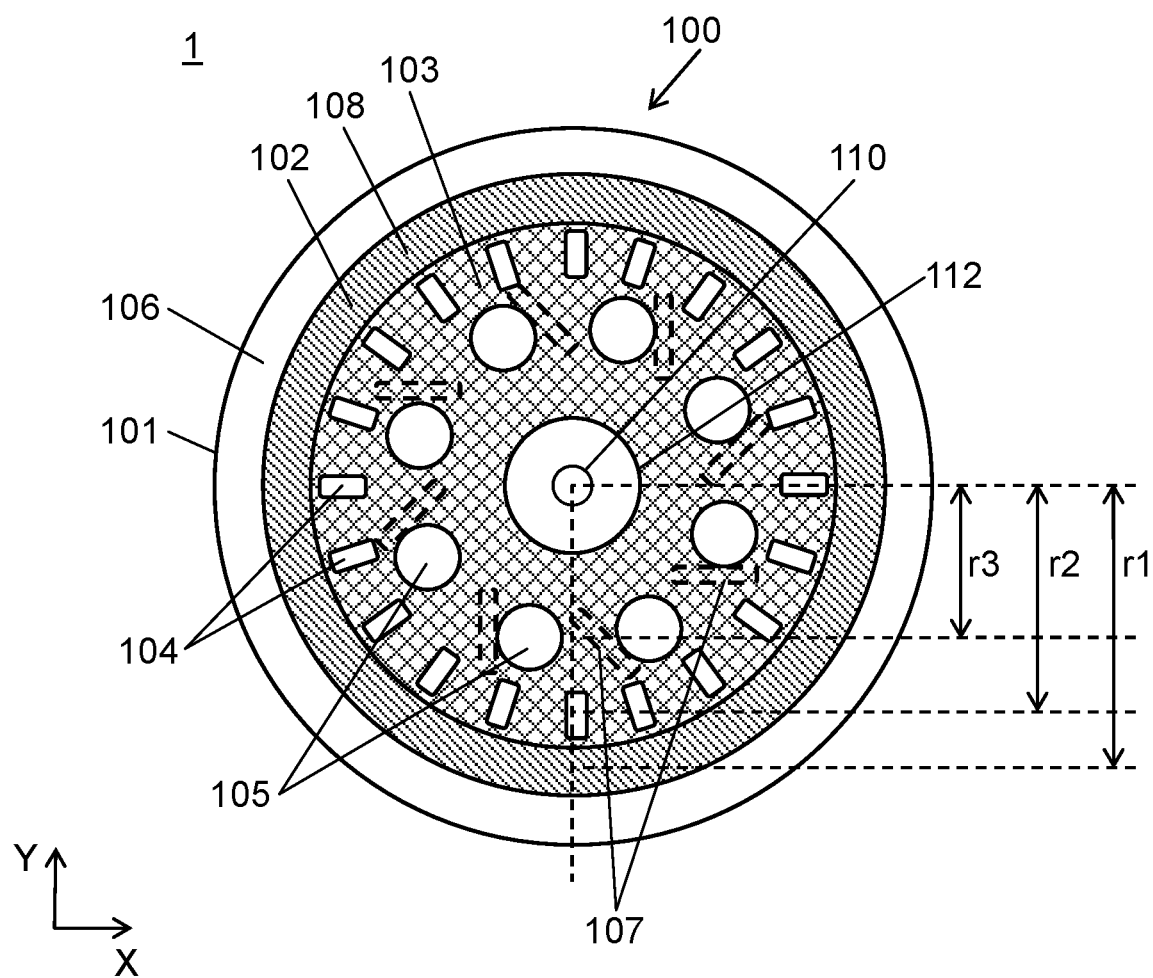
FIG. 1 is a plan view illustrating a configuration of phosphor wheel assembly 1 which is equipped with phosphor wheel module 100 according to a first embodiment.
Figure 2:
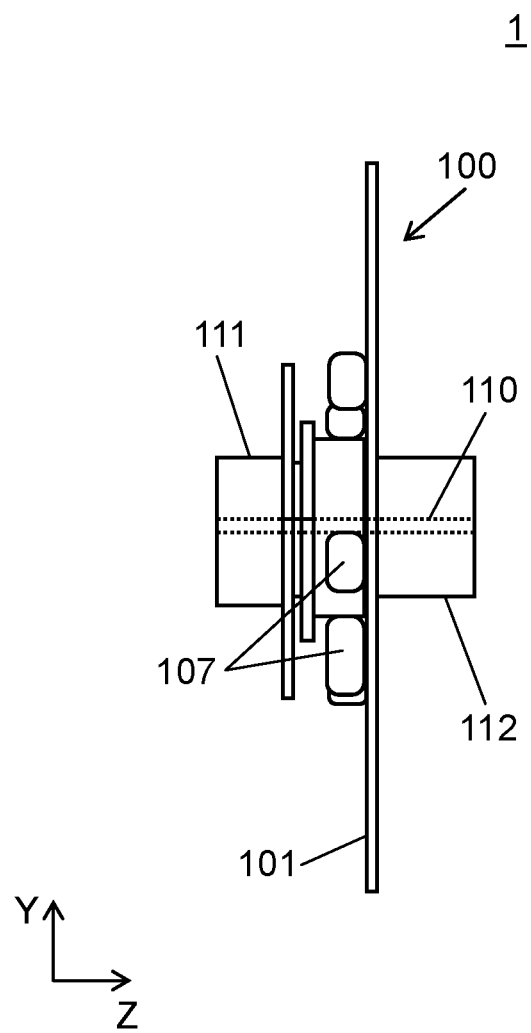
FIG. 2 is a side-elevational view illustrating the configuration of phosphor wheel assembly 1 shown in FIG. 1.

The phosphor wheel module according to the first embodiment is described, with reference to FIGS. 1 and 2.

FIG. 1 is a plan view illustrating a configuration of phosphor wheel assembly 1 that is equipped with phosphor wheel module 100 according to the first embodiment. FIG. 2 is a side-elevational view illustrating the configuration of phosphor wheel assembly 1 shown in FIG. 1.

As shown in FIG. 2, phosphor wheel assembly 1 includes phosphor wheel module 100, motor 111, and cap 112. Phosphor wheel module 100 is fixed to motor 111 with cap 112, and is rotated on rotary shaft 110 (rotation center) by motor 111. Motor 111 is a driving device to rotate phosphor wheel module 100.

As shown in FIG. 1, phosphor wheel module 100 includes: substrate 101 which is rotated on rotary shaft 110, phosphor 102, ventilation region 103, a plurality of first openings 104, a plurality of second openings 105, heat conduction region 106, and a plurality of fins 107.

Substrate 101 is made of a material with a high heat conductivity. A surface of substrate 101 serves as a reflection surface, being configured with a reflection film formed on the surface by a film forming method. On the reflection surface, phosphor 102 is formed.

Phosphor 102 configures a region (phosphor region 108) on the surface of substrate 101, with the region being disposed on at least a part of the circumference of a circle with first radius "r1" from the rotation center of substrate 101. In the first embodiment, phosphor 102 is formed by coating in an annular-ring shape. Phosphor 102 contains a phosphor that can emit fluorescent light having a major wavelength range of colors ranging from green to yellow, for example. Phosphor 102 contains a phosphor, for example, that features efficient emission of the fluorescent light achieved by efficiently absorbing a blue excitation light, and that features high resistance to thermal quenching. Phosphor 102 contains a cerium-activated garnet-structure phosphor, $Y_3Al_5O_{12}:Ce^{3+}$, for example. Phosphor 102 emits yellow light in response to the excitation light, as will be described later. Of the yellow light emitted by phosphor 102, light emitted toward the reflection film of substrate 101 (toward −Z direction of FIG. 2) is reflected off the reflection film, and then reversely travels.

Phosphor 102 shown in FIG. 1 is one example of a phosphor. Phosphor wheel module 100 shown in FIG. 1 is one example of the phosphor wheel.

Ventilation region 103 is a region of substrate 101, with the region including a plurality of openings located in closer proximity to rotary shaft 110 (rotation center) of substrate 101, compared to phosphor region 108. Such a plurality of the openings includes: a plurality of first openings 104 and a plurality of second openings 105. The plurality of first openings 104 is disposed on the circumference of a circle with second radius "r2" from the rotation center of substrate 101, with the second radius "r2" being smaller than the first radius "r1." The plurality of second openings 105 is disposed on the circumference of a circle with third radius "r3" from the rotation center of substrate 101, with the third radius "r3" being smaller than the second radius "r2."

In a case where all areas of the plurality of first openings 104 are equal to each other and all areas of the plurality of second openings 105 are equal to each other, the area of each of second openings 105 may be larger than the area of each of first openings 104.

In a case where all shapes of the plurality of first openings 104 are identical to each other and all shapes of the plurality of second openings 105 are identical to each other, the shape of each of second openings 105 may be different from the shape of each of first openings 104. In the case shown in FIG. 1, the shape of each of first openings 104 is quadrilateral and the shape of each of second openings 105 is round.

Letting S1(1), S1(2), S1(3), . . . , and S1(M) be the areas of a plurality of M pieces of first openings 104, the sum total of these areas is expressed as S1=S1(1)+S1(2)+S1(3)+ . . . +S1(M). Letting S2(1), S2(2), S2(3), . . . , and S2(N) be the areas of a plurality of N pieces of second openings 105, the sum total of these areas is expressed as S2=S2(1)+S2(2)+ S2(3)+ . . . +S2(N). In this case, sum total S2 of the areas of the plurality of second openings 105 is preferably not smaller than sum total S1 of the areas of the plurality of first openings 104.

Heat conduction region 106 is a region of substrate 101, with the region being farther away from rotary shaft 110 (rotation center) of substrate 101, compared to phosphor region 108.

Area S3 of heat conduction region 106 is preferably not smaller than the total, S1+S2, of all the areas of the pluralities of openings 104 and 105.

A plurality of fins 107 is disposed in ventilation region 103 of substrate 101 such that, when substrate 101 is rotated, the fins generate an air stream flowing from ventilation region 103 toward heat conduction region 106. In substrate 101, the plurality of fins 107 may be disposed on either the same side or the reverse side of the face on which phosphor 102 is disposed. The plurality of fins 107 is disposed on the circumference of the circle with third radius "r3" from rotary shaft 110 (rotation center) of substrate 101. Therefore, multiple fins 107 and multiple second openings 105 are disposed, in an alternating sequence, on the circumference of the circle with third radius "r3" from rotary shaft 110 of substrate 101. The angle of each of fins 107 is determined in accordance with a desired cooling efficiency.

1-2. Operation of Phosphor Wheel Module

In phosphor wheel assembly 1 shown in FIG. 1, the presence of the pluralities of openings 104 and 105 disposed in phosphor wheel module 100 allows convection of air to flow through these openings to reach the surface of the phosphor region on which phosphor 102 has been coated (i.e., the openings 104, 105 are through-holes). Such convection of air is generated by motor 111 and the plurality of fins 107. This configuration results in an improvement in heat quenching performance of the front surface of phosphor wheel module 100. Unfortunately, in general, the presence of openings in a phosphor wheel module will cause a local decrease in heat conductivity of its substrate, which in turn will increase a local temperature rise in a part of the region on which a phosphor has been coated. Hence, in phosphor wheel module 100 shown in FIG. 1, heat conduction region 106 is disposed at a position in substrate 101 such that the heat conduction region is paired with ventilation region 103 and such that the phosphor region on which phosphor 102 has been coated is interposed between the thus-paired regions. This configuration allows an improvement in the heat quenching performance of the front surface of phosphor wheel module 100, with the heat quenching being achieved via the convection of air. In addition, this configuration makes it possible to reduce a local decrease in the heat conductivity of substrate 101 and to reduce a local temperature rise of the phosphor region on which phosphor 102 has been coated. Therefore, in accordance with the first embodiment, it is possible to provide phosphor wheel module 100 and phosphor wheel assembly 1, each of which features the improved heat quenching characteristics over conventional ones.

1-3. Light Source Device Equipped with Phosphor Wheel Module

The light source device according to the first embodiment will be described with reference to FIG. 3.

Figure 3:
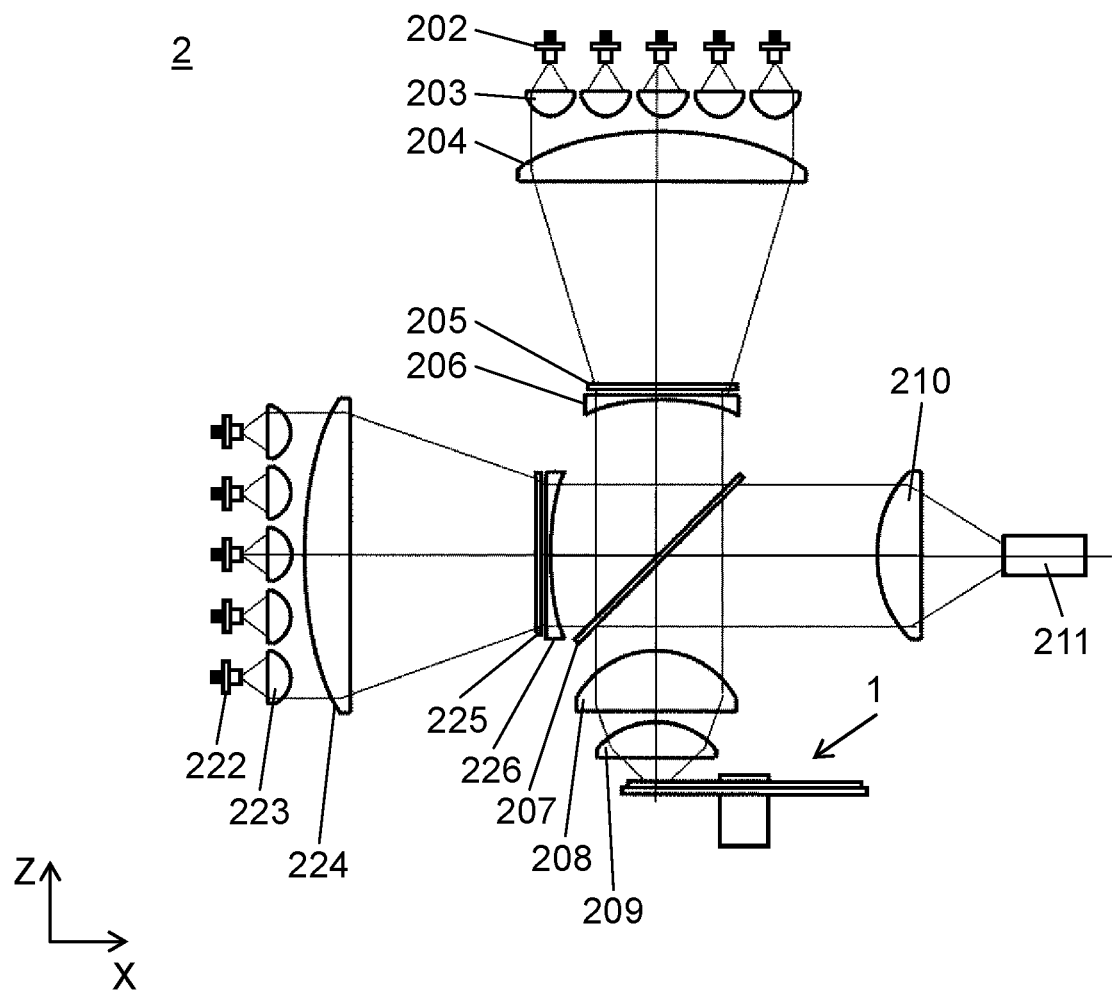
FIG. 3 is a view illustrating a configuration of light source device 2 which is equipped with phosphor wheel assembly 1 shown in FIG. 1.

FIG. 3 is a view illustrating a configuration of light source device 2 which is equipped with phosphor wheel assembly 1 shown in FIG. 1. Light source device 2 includes: phosphor wheel assembly 1, a plurality of first laser light sources 202, collimator lenses 203, convex lenses 204, 208, 209, and 210, diffusion plate 205, concave lens 206, dichroic mirror 207, rod integrator 211, a plurality of second laser light sources 222, collimator lenses 223, convex lens 224, diffusion plate 225, and concave lens 226.

The plurality of first laser light sources 202 configures an excitation light source that generates an excitation light with a predetermined wavelength.

The light emitted by the plurality of first laser light sources 202 is collimated into a parallel light by the plurality of collimator lenses 203 each of which is disposed on the emission side of the corresponding one of first laser light sources 202. Convex lens 204 is disposed on the emission side of the plurality of collimator lenses 203. Such a convex lens causes the light to converge into a luminous flux having a reduced width, with the light having been emitted by first laser light sources 202 and then having gone out from the plurality of collimator lenses 203. Then, the light, the luminous flux of which has been reduced in width by convex lens 204, enters diffusion plate 205 located on the emission side of convex lens 204. Diffusion plate 205 can eliminate still-remaining ununiformity in the luminous flux density, with the still-remaining ununiformity appearing as follows: Ununiformity in the luminous flux density appears by the time when the light emitted by first laser light sources 202 has passed through collimator lenses 203. Then, the ununiformity is insufficiently eliminated by convex lens 204, leaving the still-remaining ununiformity.

The light having gone out from diffusion plate 205 enters concave lens 206. Concave lens 206 causes the light incident thereon from diffusion plate 205 to become a parallel light.

Then, the parallel light having gone out from concave lens 206 enters dichroic mirror 207 that is disposed, at an angle of 45 degrees relative to the optical axis, on the emission side of the concave lens. Dichroic mirror 207 has properties of transmitting light in a wavelength range of the light emitted by first laser light sources 202, and of reflecting light in a wavelength range of the fluorescent light from phosphor wheel assembly 1. Accordingly, the light coming from concave lens 206 enters dichroic mirror 207, passes through it, and then enters multiple convex lenses 208 and 209 sequentially in this order. These convex lenses cause a luminance flux of the light to converge. Then, the thus-converging luminance flux enters phosphor wheel assembly 1.

Phosphor wheel assembly 1 is configured such that phosphor 102 faces convex lenses 208 and 209. With this configuration, phosphor 102 is irradiated with the light which has been generated by first laser light sources 202 and caused to converge by convex lenses 208 and 209, with the light serving as an excitation light for exciting the phosphor.

The excitation light incident on phosphor 102 from first laser light sources 202 is subjected to wavelength conversion, thereby being converted into fluorescent light in a wavelength range different from the wavelength of the light emitted by first laser light sources 202. In addition, the traveling direction of the converted light is changed by an angle of 180 degrees, and then the light goes out toward the convex lens 209 side. The going-out fluorescent light enters convex lens 209, passes through it, and then enters convex lens 208 to pass through it, thereby becoming a parallel fluorescent light. Then, the parallel fluorescent light enters dichroic mirror 207 by which the traveling direction of the light is changed by an angle of 90 degrees.

Next, light emitted by the plurality of second laser light sources 222 is collimated into a parallel light by collimator lenses 223 each of which is disposed on the emission side of the corresponding one of second laser light sources 222. Convex lens 224 is disposed on the emission side of a plurality of collimator lenses 223. Such a convex lens causes the parallel light to converge into a luminous flux having a reduced width, with the light having been generated by second laser light sources 222 and then having gone out from the plurality of collimator lenses 223. Then, the light having gone out from convex lens 224 by which the width of luminous flux of the light has been reduced, enters diffusion plate 225 located on the emission side of convex lens 224. Diffusion plate 225 can eliminate still-remaining ununiformity in the luminous flux density, with the still-remaining ununiformity appearing as follows: Ununiformity in the luminous flux density appears by the time when the light emitted by first laser light sources 222 has passed through collimator lenses 223. Then, the ununiformity is insufficiently eliminated by convex lens 224, leaving the still-remaining ununiformity.

The light having gone out from diffusion plate 225 enters concave lens 226. Concave lens 226 causes the light incident thereon from diffusion plate 225 to become a parallel light.

Then, the parallel light having gone out from concave lens 226 enters dichroic mirror 207 that is disposed, at an angle of 45 degrees relative to the optical axis, on the emission side of the concave lens. The incident direction of the parallel light entering the dichroic mirror is different, by an angle of 90 degrees, from that of the fluorescent light emitted by phosphor wheel assembly 1 and then entering the dichroic mirror. Dichroic mirror 207 has properties of transmitting light in a wavelength range of the light emitted by first laser light sources 202 and second laser light sources 222, and of reflecting light in a wavelength range of the fluorescent light emitted by phosphor wheel assembly 1. Accordingly, dichroic mirror 207 transmits the light incident on the dichroic mirror from concave lens 226. As a result, both the fluorescent light emitted by phosphor wheel assembly 1 and the light emitted by second laser light sources 222 go out together toward the same direction.

Both the fluorescent light from phosphor wheel assembly 1 and the laser light from second laser light sources 222, are caused to converge by convex lens 210 to enter rod integrator 211 which serves as a means of making light uniform. Then, the light goes out from rod integrator 211, with the distribution of intensity of the light having been made uniform.

Here, the light emitted by second laser light sources 222 is light in a wavelength range of blue color; the light emitted by first laser light sources 202 is light in a wavelength range of from-ultraviolet-to-blue color. Moreover, phosphor wheel assembly 1 is excited by the light in the wavelength range of first laser light sources 202, thereby emitting a yellow fluorescent light in a wavelength range that contains both a wavelength range of green color and a wavelength range of red color.

With the configuration described above, rod integrator 211 of light source device 2 emits white light with uniformly-distributed intensity.

In accordance with light source device 2, the excitation light from first laser light sources 202 is guided to phosphor wheel module 100, through use of a light-guiding optical system that includes the lenses and the mirror. Then, phosphor 102 of phosphor wheel module 100 is irradiated with the thus-guided excitation light to generate the fluorescent light.

1-4. Projection Display Apparatus Using Light Source Device Equipped with Phosphor Wheel The projection display apparatus according to the first embodiment will be described with reference to FIG. 4.

Figure 4:
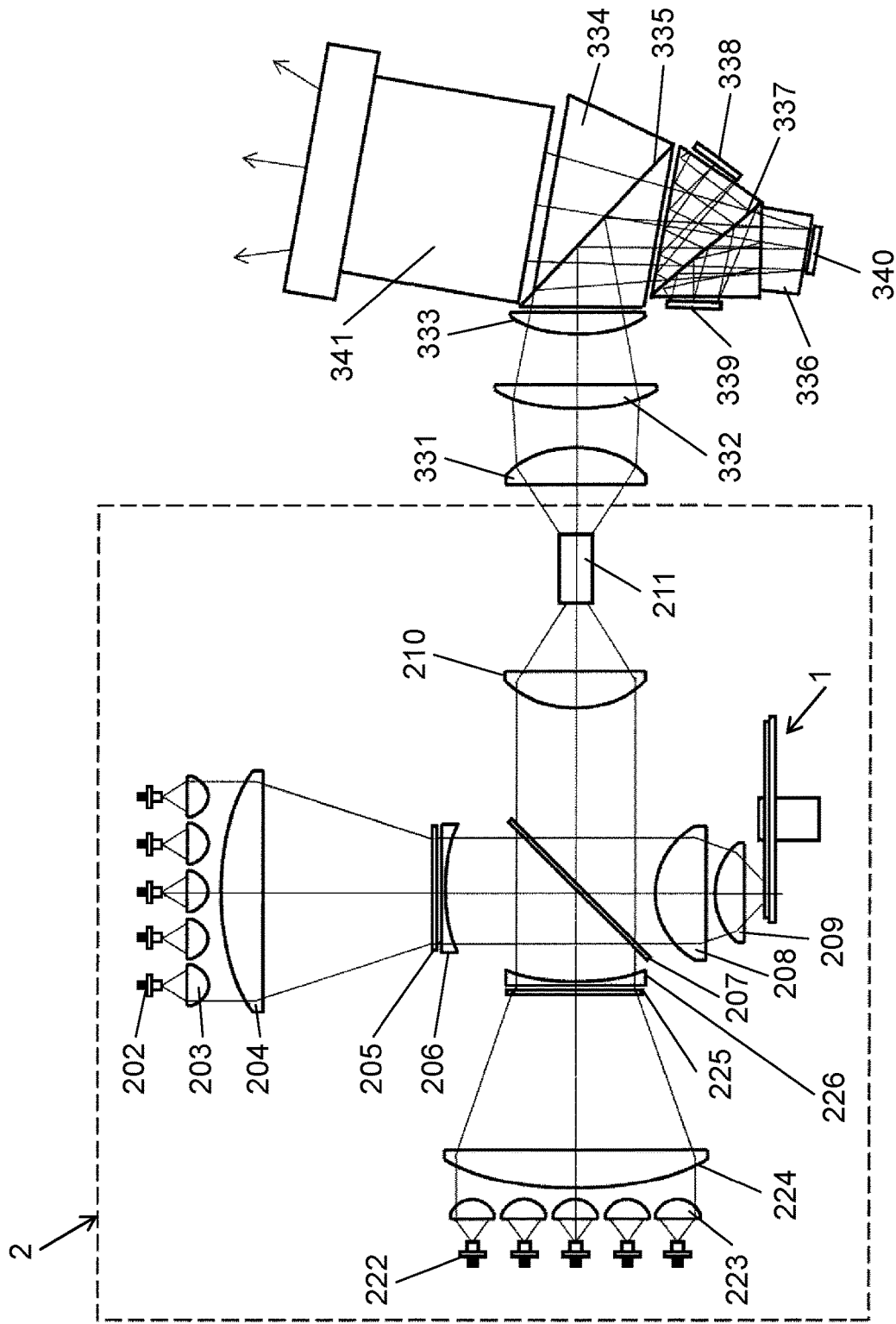
FIG. 4 is a view illustrating a configuration of a projection display apparatus which is equipped with light source device 2 shown in FIG. 3.

FIG. 4 is a view illustrating a configuration of the projection display apparatus which is equipped with light source device 2 shown in FIG. 3. The projection display apparatus shown in FIG. 4 includes: light source device 2, convex lenses 331, 332, and 333, total reflection prism 334, narrow gap 335, color prism 336, narrow gap 337, digital micromirror devices (DMDs) 338, 339, and 340, and projection lens 341.

The projection display apparatus shown in FIG. 4 includes light source device 2 that has been described above by using FIG. 3. Regarding the details of light source device 2, repetitive descriptions are omitted. Hereinafter, descriptions will be made focusing on behavior of the white light having gone out from rod integrator 211, and a configuration of the projection display apparatus.

First, the white light having gone out from rod integrator 211 is projected onto DMDs 338, 339, and 340 to be described later, through use of a relay lens system configured with three convex lenses 331, 332, and 333, thereby mapping the emitting plane of rod integrator 211 onto the DMDs.

The light having passed through convex lenses 331, 332, and 333 which configure the relay lens system, enters total reflection prism 334 which is configured with two glass blocks, with narrow gap 335 being interposed between the blocks. The light incident on total reflection prism 334 is reflected off the narrow gap 335 described above to enter color prism 336 which is configured with three glass blocks. Color prism 336 includes: narrow gap 337 interposed between a first glass block and a second glass block; and a dichroic plane disposed on the first glass block side, with the dichroic plane reflecting light in a wavelength range of blue color.

Of the white light incident on color prism 336 from total reflection prism 334, light in a wavelength range of blue color is reflected off the dichroic plane that is disposed on the first glass block located on the front side of narrow gap 337, with the dichroic plane being used for reflecting light in a wavelength range of blue color. The blue light having been reflected off the dichroic plane is subjected to total reflection by the gap disposed between color prism 336 and total reflection prism 334. Through the total reflection, the blue light changes its traveling direction to enter DMD 338 for blue color.

Then, yellow light containing both light in a wavelength range of red color and light in a wavelength range of green color, passes through narrow gap 337. The yellow light having passed through the narrow gap is then separated into red light and green light by a dichroic plane that is disposed at a boundary plane between the second and third glass blocks of color prism 336. Such a dichroic plane has properties of reflecting light in a wavelength range of red color, and of transmitting light in a wavelength range of green color. Of the thus-separated red and green lights, the red light is reflected while the green light is transmitted to enter the third glass block.

The red light having reflected off the boundary plane between the second and third glass blocks, enters narrow gap 337 disposed between the second and first glass blocks, with an incident angle of the red light being not smaller than the angle of total reflection, thereby being reflected to enter DMD 339 for red color.

The green light having entered the third glass block keeps traveling in straight lines, and then enters DMD 340 for green color.

Each of three DMDs 338, 339, and 340 is driven by a not-shown video circuit such that each of pixels of every DMD is switched between ON and OFF in response to image information, thereby changing light-reflection directions of the individual pixels.

The light having gone out from each of ON-pixels of three DMDs 338, 339, and 340 travels back along the corresponding path described above. Then, these back-traveling lights are combined by color prism 336 into white light to enter the total reflection prism. The white light having entered the total reflection prism enters narrow gap 335 of the total reflection prism, with an incident angle of the white light being not larger than the angle of total reflection, and the white light keeps traveling to pass through the gap. Then, the light is enlarged and projected by projection lens 341 onto a screen not shown.

1-5. Advantageous Effects in Accordance with First Embodiment

Phosphor wheel module 100 according to the first embodiment includes: substrate 101 and phosphor region 108. The phosphor region includes phosphor 102 disposed on at least a part of the circumference of the circle with first radius "r1" from the rotation center of substrate 101, on the surface of substrate 101. Substrate 101 includes ventilation region 103 and heat conduction region 106. The ventilation region includes a plurality of the openings located in closer proximity to the rotation center of substrate 101, compared to phosphor region 108. The heat conduction region is farther away from the rotation center of substrate 101, compared to phosphor region 108.

The configuration makes it possible to reduce a decrease in the heat conductivity of the substrate and to reduce a local temperature rise of the phosphor. As a result, the phosphor wheel module can be provided, featuring improved heat quenching characteristics over conventional ones.

Phosphor wheel module 100 according to the first embodiment is such that the area of heat conduction region 106 is not smaller than the sum total of all the areas of the plurality of the openings.

This configuration makes it possible to reduce the following disadvantages resulted from the presence of the openings. That is, a decrease in the heat conductivity of the substrate and a local temperature rise of the phosphor.

Phosphor wheel module 100 according to the first embodiment is such that the plurality of the openings includes: a plurality of first openings 104, and a plurality of second openings 105. The plurality of first openings 104 is disposed on the circumference of the circle with second radius "r2" from the rotation center of substrate 101, with the second radius "r2" being smaller than the first radius "r1." The plurality of second openings 105 is disposed on the circumference of the circle with third radius "r3" from the rotation center of substrate 101, with the third radius "r3" being smaller than the second radius "r2."

Phosphor wheel module 100 according to the first embodiment is such that the sum total of areas of the plurality of second openings 105 is not smaller than the sum total of areas of the plurality of first openings 104.

Phosphor wheel module 100 according to the first embodiment is such that the area of each of second openings 105 is larger than the area of each of first openings 104.

Phosphor wheel module 100 according to the first embodiment is such that the shape of each of second openings 105 is different from the shape of each of first openings 104.

Phosphor wheel module 100 according to the first embodiment further includes a plurality of fins 107 that is disposed in ventilation region 103 of substrate 101. Such fins generate an air stream that flows from ventilation region 103 toward heat conduction region 106, when substrate 101 is rotated.

Phosphor wheel module 100 according to the first embodiment is such that the plurality of fins 107 is disposed on the circumference of the circle with third radius "r3" from the rotation center of substrate 101.

This configuration makes it possible to reduce a decrease in the heat conductivity of the substrate and to reduce a local temperature rise of the phosphor, thereby allowing the phosphor wheel module to be provided which features improved heat quenching characteristics over conventional ones.

The light source device according to the first embodiment includes: phosphor wheel module 100 described above, motor 111 for rotating phosphor wheel module 100, first laser light sources 202 for generating an excitation light with a predetermined wavelength, and the light-guiding optical system for guiding the excitation light to phosphor wheel module 100. Phosphor 102 of phosphor wheel module 100 is irradiated with the excitation light, thereby generating fluorescent light.

This configuration makes it possible to reduce a decrease in the heat conductivity of the substrate of the phosphor wheel module and to reduce a local temperature rise of the phosphor, thereby allowing the light source device to be provided which features improved heat quenching characteristics over conventional ones.

The projection display apparatus according to the first embodiment includes light source device 2 described above.

This configuration makes it possible to reduce a decrease in the heat conductivity of the substrate of the phosphor wheel module and to reduce a local temperature rise of the phosphor, thereby allowing the projection display apparatus to be provided which features improved heat quenching characteristics over conventional ones.

Second Exemplary Embodiment

Descriptions will be made regarding a phosphor wheel module, light source device, and projection display apparatus, according to a second embodiment, with reference to FIGS. 5 to 7.

2-1. Phosphor Wheel Module

Figure 5:
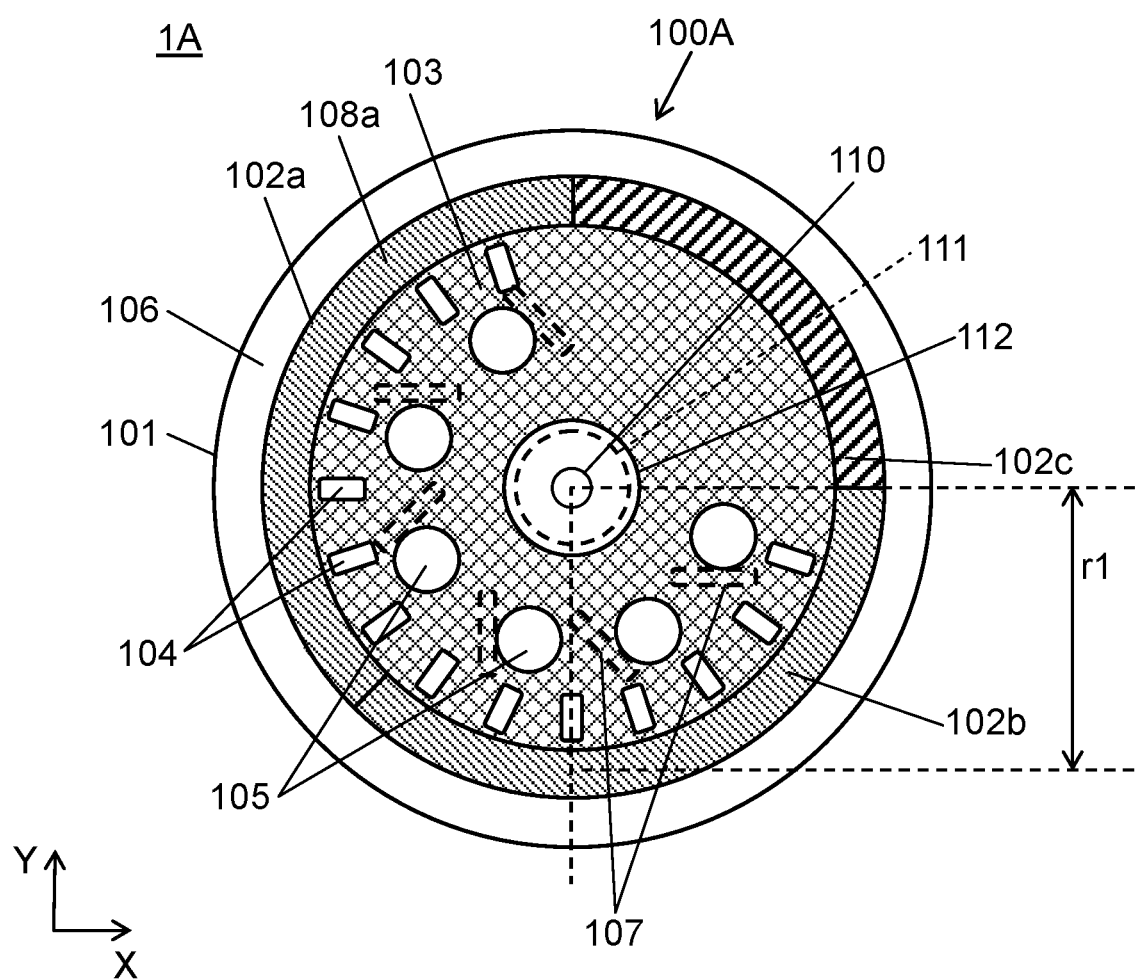
FIG. 5 is a plan view illustrating a configuration of phosphor wheel assembly 1A according to a second embodiment.

The phosphor wheel module according to the second embodiment is described, with reference to FIG. 5.

FIG. 5 is a plan view illustrating a configuration of phosphor wheel assembly 1A according to the second embodiment. Phosphor wheel assembly 1A includes phosphor wheel module 100A. As in the case of phosphor wheel assembly 1 shown in FIG. 2, phosphor wheel assembly 1A further includes motor 111 and cap 112.

Phosphor wheel module 100A includes: substrate 101, phosphors 102a and 102b transmission region 102c, ventilation region 103, a plurality of first openings 104, a plurality of second openings 105, heat conduction region 106, and a plurality of fins 107. Phosphor wheel module 100A includes: phosphors 102a and 102b, and transmission region 102c, instead of phosphor 102 which is formed by coating in an annular-ring shape as shown in FIG. 1.

Phosphors 102a and 102b and transmission region 102c are disposed on the circumference of a circle with predetermined radius "r1" from the rotation center of substrate 101, on the surface of substrate 101.

Phosphors 102a and 102b generate different fluorescent lights with wavelengths different from each other. Phosphors 102a is a phosphor that generates fluorescent light having a major wavelength range of yellow color, for example. Phosphors 102a is a phosphor, for example, that features efficient emission of the fluorescent light achieved by efficiently absorbing a blue excitation light, and that features high resistance to thermal quenching. Phosphor 102a is a cerium-activated garnet-structure phosphor, $Y_3Al_5O_{12}:Ce^{3+}$, for example. Phosphors 102b is a phosphor that generates fluorescent light having a major wavelength range of green color, for example. Phosphors 102b is a phosphor, for example, that features efficient emission of the fluorescent light achieved by efficiently absorbing a blue excitation light, and that features high resistance to thermal quenching. Phosphor 102b is a cerium-activated garnet-structure phosphor, $Lu_3Al_5O_{12}:Ce^{3-}$, for example. Phosphor 102a emits yellow light in response to the excitation light, as will be described later. Of the yellow light emitted by phosphor 102a, light emitted toward the reflection film of substrate 101 is reflected off the reflection film, and then reversely travels. Moreover, phosphor 102b emits green light in response to the excitation light, as will be described later. Of the green light emitted by phosphor 102b, light emitted toward the reflection film of substrate 101 is reflected off the reflection film, and then reversely travels.

Substrate 101 includes transmission region 102c disposed on the circumference of the circle with first radius "r1" from the rotation center of substrate 101. No phosphor is disposed on the transmission region; light can pass through the transmission region. In at least a portion of transmission region 102c, substrate 101 may be made of a transmissive material or, alternatively, may include an opening. As will be described later, part of the excitation light applied to phosphor wheel assembly 1A is not used for phosphors 102a and 102b to generate the fluorescent light, but is allowed to pass through transmission region 102c to reach a DMD with the part of the excitation light remaining unchanged.

Phosphors 102a and 102b shown in FIG. 5 is one example of the phosphors; phosphor wheel module 100A shown in FIG. 5 is one example of the phosphor wheel.

The other constituent elements of phosphor wheel module 100A are the same as the corresponding constituent elements of phosphor wheel module 100 shown in FIG. 1.

2-2. Operation of Phosphor Wheel Module

In accordance with phosphor wheel assembly 1A shown in FIG. 5, it is possible to improve the heat quenching performance of phosphor wheel module 100, as in the case of the first embodiment. Moreover, it is possible to reduce a local decrease in the heat conductivity of substrate 101 and to reduce a local temperature rise of the phosphor region on which phosphor 102 has been coated.

Because of the absence of any phosphor in transmission region 102c, even if the transmission region is irradiated with the excitation light, the region generates less heat than the regions of phosphors 102a and 102b. This eliminates the need for preparing means of cooling, i.e. the pluralities of openings 104 and 105 and the plurality of fins 107, in the vicinity of transmission region 102c.

2-3. Light Source Device Using Phosphor Wheel

The light source device according to the second embodiment will be described with reference to FIG. 6.

Figure 6:
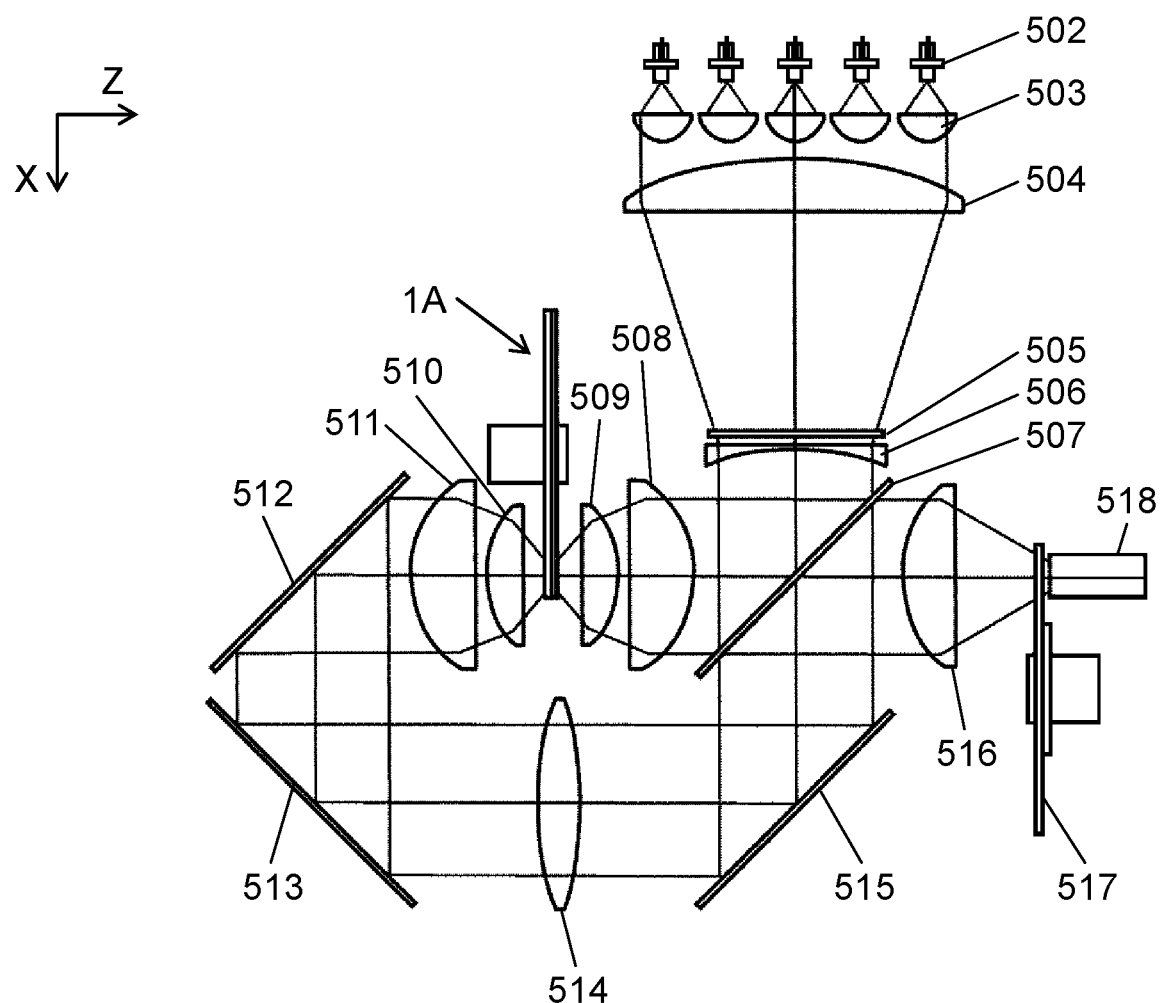
FIG. 6 is a view illustrating a configuration of light source device 2A that is equipped with phosphor wheel assembly 1A shown in FIG. 5.

FIG. 6 is a view illustrating a configuration of light source device 2A that is equipped with phosphor wheel assembly 1A shown in FIG. 5. Light source device 2A includes: phosphor wheel assembly 1A, a plurality of first laser light sources 502, collimator lenses 503, convex lenses 504, 508, 509, 510, 511, and 516, diffusion plate 505, concave lens 506, dichroic mirror 507, mirrors 512, 513, and 515, relay lens 514, filter wheel 517, and rod integrator 518.

The plurality of first laser light sources 502 configures an excitation light source that generates an excitation light with a predetermined wavelength.

The light emitted by the plurality of first laser light sources 502 is collimated into a parallel light by collimator lenses 503 each of which is disposed on the emission side of the corresponding one of first laser light sources 502. Convex lens 504 is disposed on the emission side of a plurality of collimator lenses 503. Such a convex lens causes the light to converge into a luminous flux having a reduced width, with the light having been generated by first laser light sources 502 and then having gone out from the plurality of collimator lenses 503. Then, the emitted light, the luminous flux of which has been reduced in width by convex lens 504, enters diffusion plate 505 located on the emission side of convex lens 504. Diffusion plate 505 can eliminate still-remaining ununiformity in the luminous flux density, with the still-remaining ununiformity appearing as follows: Ununiformity in the luminous flux density appears by the time when the light emitted by first laser light sources 502 has passed through collimator lenses 503. Then, the ununiformity is insufficiently eliminated by convex lens 504, leaving the still-remaining ununiformity.

The light having gone out from diffusion plate 505 enters concave lens 506. Concave lens 506 causes the light incident thereon from diffusion plate 505 to become a parallel light.

Then, the parallel light having gone out from concave lens 506 enters dichroic mirror 507 that is disposed, at an angle of 45 degrees relative to the optical axis, on the emission side of the concave lens. Dichroic mirror 507 has properties of reflecting light in a wavelength range of the light emitted by first laser light sources 502, and of transmitting light in a wavelength range of the fluorescent light from phosphor wheel assembly 1A. Accordingly, the light having come from concave lens 506 enters dichroic mirror 507, passes through it, and then enters multiple convex lenses 508 and 509 sequentially in this order. These convex lenses cause a luminance flux of the light to converge. Then, the thus-converging luminance flux enters phosphor wheel assembly 1A.

Phosphor wheel assembly 1A is configured such that phosphors 102a and 102b face convex lenses 508 and 509. With this configuration, phosphors 102a and 102b are irradiated with the light which has been generated by first laser light sources 502 and caused to converge by convex lenses 508 and 509, with the light serving as an excitation light for exciting the phosphors.

The excitation light incident on each of phosphors 102a and 102b from first laser light sources 502 is subjected to wavelength conversion, thereby being converted into fluorescent light in a wavelength range different from the wavelength of the light emitted by first laser light sources 502. In addition, the traveling direction of the converted light is changed by an angle of 180 degrees, and then the light goes out toward the convex lens 509 side. The going-out fluorescent light enters convex lens 509, passes through it, and then enters convex lens 508 to pass through it, thereby becoming a parallel fluorescent light. Then, the parallel fluorescent light passes through dichroic mirror 207 to travel in straight lines.

On the other hand, as previously described, phosphors 102a and 102b and transmission region 102c are disposed on the circumference of the circle with predetermined radius "r1" from the rotation center of substrate 101, on the surface of substrate 101. Accordingly, part of the excitation light, which is applied to phosphor wheel assembly 1A, passes through transmission region 102c to go out toward the convex lens 510 side. The part of the excitation light enters convex lens 510, passes through it, and enters convex lens 511 to pass through it, thereby being caused to become a parallel light. After that, the part of the excitation light enters dichroic mirror 507, via mirrors 512 and 513, relay lens 514, and mirror 515. The light incident on dichroic mirror 507 from mirror 515 is caused to change its traveling direction by an angle of 90 degrees. As a result, both the fluorescent light having been emitted by phosphor wheel assembly 1A and the part of the excitation light having passed through phosphor wheel assembly 1A, go out together in the same direction.

Here, the light emitted by first laser light sources 502 is light in a wavelength range of blue color. Moreover, phosphor wheel assembly 1A is excited by the light in a wavelength range of first laser light source 502, thereby emitting the following lights on a time-series basis. The lights are light having a major wavelength range of green color and light having a major wavelength range of yellow color. Furthermore, the part of the excitation light having passed through phosphor wheel assembly 1A is not used for the phosphors to generate fluorescent light. Instead, the part of the excitation light passes through transmission region 102c to enter a DMD, remaining unchanged.

The combined light which has been combined by dichroic mirror 507 is caused to converge by convex lens 516, passes through filter wheel 517, and then enters integrator 518 that serves as a means of making light uniform. At this time, part of the light having a major wavelength range of yellow color, which has been generated by phosphor wheel assembly 1A, is converted into light having a major wavelength range of red color. Moreover, during passing through rod integrator 518, the distribution of intensity of the light is made uniform.

With the configuration described above, each of the red, green, and blue lights sequentially goes out from rod integrator 518 of light source device 2A, on a time-series basis, with each of the lights having been uniformed in its intensity distribution.

2-4. Projection Display Apparatus Using Light Source Device Equipped with Phosphor Wheel The projection display apparatus according to the second embodiment will be described with reference to FIG. 7.

Figure 7:
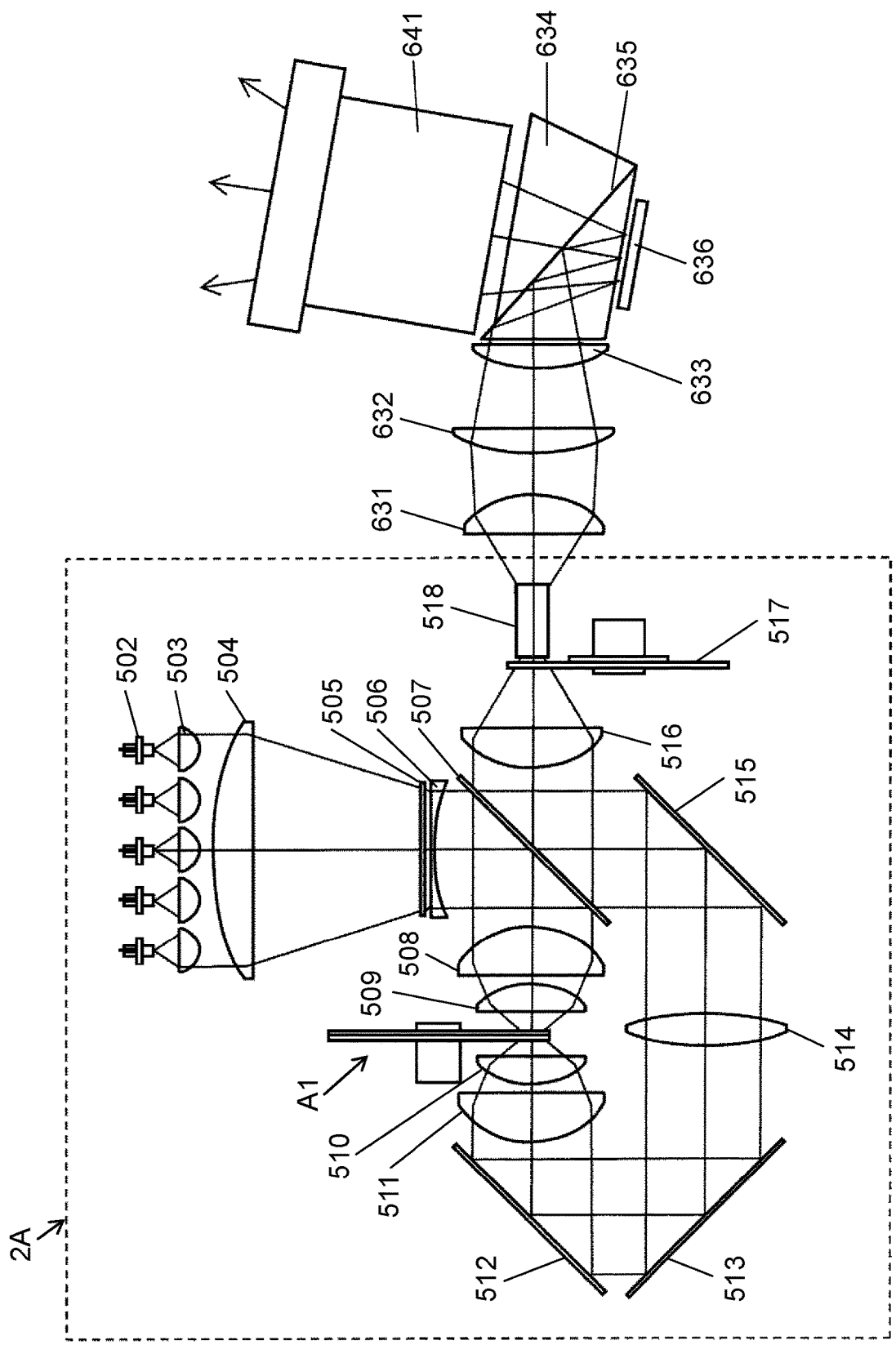
FIG. 7 is a view illustrating a configuration of a projection display apparatus that is equipped with light source device 2A shown in FIG. 6.

FIG. 7 is a view illustrating a configuration of the projection display apparatus that is equipped with light source device 2A shown in FIG. 6. The projection display apparatus shown in FIG. 7 includes light source device 2A, convex lenses 631, 632, and 633, total reflection prism 634, narrow gap 635, DMD 636, and projection lens 641.

The projection display apparatus uses light source device 2A that has been described above by using FIG. 6. Regarding the details of light source device 2, repetitive descriptions are omitted. Hereinafter, descriptions will be made focusing on behavior of the light having gone out from rod integrator 518 and a configuration of the projection display apparatus.

First, the light having gone out from rod integrator 518 is projected onto DMD 636 to be described later, through use of a relay lens system configured with three convex lenses 631, 632, and 633, thereby mapping the emitting plane of rod integrator 518 onto the DMD.

The light having passed through convex lenses 631, 632, and 633 which configure the relay lens system, enters total reflection prism 634 which is configured with two glass blocks with narrow gap 635 being interposed between the blocks. The light incident on total reflection prism 634 is reflected off the narrow gap 635 described above to enter DMD 636.

DMD 636 is driven by a not-shown video circuit such that each of pixels of the DMD is switched between ON and OFF in response to image information, thereby changing light-reflection directions of the individual pixels.

The light having gone out from ON-pixels of DMD 636 enters the total reflection prism. Then, the light enters narrow gap 635 of the total reflection prism, with an incident angle being not larger than the angle of total reflection, and the light keeps traveling to pass through the gap. Then, the light is enlarged and projected by projection lens 641 onto a screen not shown.

2-5. Advantageous Effects in Accordance with Second Embodiment

Phosphor wheel module 100A according to the second embodiment is such that substrate 101 includes: phosphor region 108a including phosphors 102a and 102b, and transmission region 102c on which no phosphor is formed, with both the regions being disposed on the circumference of the circle with first radius "r1" from the rotation center of substrate 101. Substrate 101 includes ventilation region 103 and heat conduction region 106. The ventilation region includes a plurality of the openings located in closer proximity to the rotation center of substrate 101, compared to phosphor region. The heat conduction region is farther away from the rotation center of substrate 101, compared to the phosphor region 108a.

With this configuration, light source device 2A is such that each of the red, green, and blue lights sequentially goes out from rod integrator 518, on a time-series basis, with each of the lights having been uniformed in its intensity distribution. The configuration makes it possible to reduce a decrease in the heat conductivity of the substrate and to reduce a local temperature rise of the phosphors, thereby allowing the phosphor wheel module to be provided which features improved heat quenching characteristics over conventional ones.

Other Exemplary Embodiments

As described above, the first and second embodiments have been described to exemplify the technology disclosed in the present application. However, the technology is not limited to these embodiments, and is also applicable to embodiments that are subjected, as appropriate, to various changes and modifications, replacements, additions, omissions, and the like. Moreover, the technology disclosed herein also allows another embodiment which is configured by combining the appropriate constituent elements in the first and second embodiments described above.

The heat conduction region may include at least one opening.

The substrate is not limited to the flat plane. The substrate may have any shape, at least one part of which includes a curved shape, a bent shape, or the like, as long as the fluorescent light is allowed to be emitted toward an appropriate direction.

The shape of the openings is not limited to round and quadrilateral ones. The shape may be any shape that includes an ellipse and other polygons.

As described above, the exemplary embodiments have been described to exemplify the technology according to the present disclosure. To that end, the accompanying drawings and the detailed descriptions have been provided.

Therefore, the constituent elements described in the accompanying drawings and the detailed descriptions may include not only essential elements for solving the problems, but also inessential ones for solving the problems which are described only for the exemplification of the technology described above. For this reason, it should not be acknowledged that these inessential elements are considered to be essential only on the grounds that these inessential elements are described in the accompanying drawings and/or the detailed descriptions.

Moreover, because the aforementioned embodiments are used only for the exemplification of the technology disclosed herein, it is to be understood that various changes and modifications, replacements, additions, omissions, and the like may be made to the embodiments without departing from the scope of the appended claims or the scope of their equivalents.

The phosphor wheel module according to the present disclosure is applicable to light source devices and projection display apparatuses.

What is claimed is:

1. A phosphor wheel module, comprising:
   a rotatable substrate having a rotation center; and
   a phosphor region disposed on a surface of the substrate, the phosphor region including a phosphor disposed on at least a part of a circumference of a circle having a first radius from the rotation center,
   wherein the substrate includes:
      a ventilation region including a plurality of openings located closer to the rotation center than the phosphor region, each of the plurality of openings being a through-hole; and
      a heat conduction region located farther away from the rotation center than the phosphor region;
      wherein an area of the heat conduction region is equal to or larger than a sum total of areas of the plurality of the openings.

2. The phosphor wheel module according to claim 1, wherein the plurality of the openings includes:
   a plurality of first openings disposed on a circumference of a circle having a second radius from the rotation center of the substrate, the second radius being smaller than the first radius; and
   a plurality of second openings disposed on a circumference of a circle having a third radius from the rotation center of the substrate, the third radius being smaller than the second radius.

3. The phosphor wheel module according to claim 2, wherein a sum total of areas of the plurality of the second openings is equal to or larger than a sum total of areas of the plurality of the first openings.

4. The phosphor wheel module according to claim 2,
wherein the areas of the plurality of the first openings are equal to each other;
the areas of the plurality of the second openings are equal to each other; and
each of the areas of the plurality of the second openings is larger than each of the areas of the plurality of the first openings.

5. The phosphor wheel module according to claim 2,
wherein shapes of the plurality of the first openings are identical to each other;
shapes of the plurality of the second openings are identical to each other; and
each of the shapes of the plurality of the second openings is different from each of the shapes of the plurality of the first openings.

6. The phosphor wheel module according to claim 2, further comprising a plurality of fins disposed in the ventilation region of the substrate, for generating an air stream that flows from the ventilation region toward the heat conduction region when the substrate is rotated.

7. The phosphor wheel module according to claim 6, wherein the plurality of the fins is disposed on the circumference of the circle having the third radius from the rotation center of the substrate.

8. The phosphor wheel module according to claim 1, wherein the substrate includes a transmission region disposed on the circumference of the circle having the first radius from the rotation center of the substrate, the transmission region including no phosphor, the transmission region transmitting light.

9. A light source device, comprising:
the phosphor wheel module according to claim 1;
a driving device for rotating the phosphor wheel module;
an excitation light source for generating excitation light with a predetermined wavelength; and
a light-guiding optical system for guiding the excitation light to the phosphor wheel module,
wherein fluorescent light is generated by irradiating the phosphor of the phosphor wheel module with the excitation light.

10. A projection display apparatus, comprising the light source device according to claim 9.

11. A phosphor wheel module, comprising:
a rotatable substrate having a rotation center; and
a phosphor region disposed on a surface of the substrate, the phosphor region including a phosphor disposed on at least a part of a circumference of a circle having a first radius from the rotation center,
wherein the substrate includes:
a ventilation region including a plurality of openings located closer to the rotation center than the phosphor region, each of the plurality of openings being a through-hole; and
a heat conduction region located farther away from the rotation center than the phosphor region;
wherein the plurality of the openings includes:
a plurality of first openings disposed on a circumference of a circle having a second radius from the rotation center of the substrate, the second radius being smaller than the first radius; and
a plurality of second openings disposed on a circumference of a circle having a third radius from the rotation center of the substrate, the third radius being smaller than the second radius.

12. The phosphor wheel module according to claim 11, wherein a sum total of areas of the plurality of the second openings is equal to or larger than a sum total of areas of the plurality of the first openings.

13. The phosphor wheel module according to claim 11,
wherein the areas of the plurality of the first openings are equal to each other;
the areas of the plurality of the second openings are equal to each other; and
each of the areas of the plurality of the second openings is larger than each of the areas of the plurality of the first openings.

14. The phosphor wheel module according to claim 11,
wherein shapes of the plurality of the first openings are identical to each other;
shapes of the plurality of the second openings are identical to each other; and
each of the shapes of the plurality of the second openings is different from each of the shapes of the plurality of the first openings.

15. The phosphor wheel module according to claim 11, further comprising a plurality of fins disposed in the ventilation region of the substrate, for generating an air stream that flows from the ventilation region toward the heat conduction region when the substrate is rotated.

16. The phosphor wheel module according to claim 15, wherein the plurality of the fins is disposed on the circumference of the circle having the third radius from the rotation center of the substrate.

17. The phosphor wheel module according to claim 11, wherein the substrate includes a transmission region disposed on the circumference of the circle having the first radius from the rotation center of the substrate, the transmission region including no phosphor, the transmission region transmitting light.

18. A light source device, comprising:
the phosphor wheel module according to claim 11;
a driving device for rotating the phosphor wheel module;
an excitation light source for generating excitation light with a predetermined wavelength; and
a light-guiding optical system for guiding the excitation light to the phosphor wheel module,
wherein fluorescent light is generated by irradiating the phosphor of the phosphor wheel module with the excitation light.

19. A projection display apparatus, comprising the light source device according to claim 18.

* * * * *